(12) United States Patent
Naven et al.

(10) Patent No.: US 8,040,907 B2
(45) Date of Patent: Oct. 18, 2011

(54) SWITCHING METHOD

(75) Inventors: Finbar Naven, Cheshire (GB); Paul Howarth, Sale (GB)

(73) Assignee: Virtensys Ltd., Cheshire (GB)

( * ) Notice: Subject to any disclaimer, the term of this patent is extended or adjusted under 35 U.S.C. 154(b) by 23 days.

(21) Appl. No.: 12/252,934

(22) Filed: Oct. 16, 2008

(65) Prior Publication Data

US 2010/0002716 A1    Jan. 7, 2010

(30) Foreign Application Priority Data

Jul. 7, 2008  (GB) .................................. 0812404.2

(51) Int. Cl.
*H04L 12/56* (2006.01)
(52) U.S. Cl. ........................................ 370/413; 370/419
(58) Field of Classification Search .................. None
See application file for complete search history.

(56) References Cited

U.S. PATENT DOCUMENTS

| | | | |
|---|---|---|---|
| 5,978,359 A | 11/1999 | Caldara et al. | |
| 6,678,277 B1 * | 1/2004 | Wils et al. | 370/412 |
| 6,876,649 B1 * | 4/2005 | Beshai | 370/355 |
| 6,961,342 B1 | 11/2005 | Uzun et al. | |
| 7,002,981 B2 * | 2/2006 | Johnson et al. | 370/416 |
| 7,477,657 B1 * | 1/2009 | Murphy et al. | 370/468 |
| 2001/0043606 A1 | 11/2001 | Han et al. | |
| 2002/0075883 A1 | 6/2002 | Dell et al. | |
| 2002/0176431 A1 * | 11/2002 | Golla et al. | 370/412 |
| 2003/0137940 A1 * | 7/2003 | Schwartz et al. | 370/235 |
| 2003/0225737 A1 | 12/2003 | Mathews | |
| 2004/0071144 A1 | 4/2004 | Beeri et al. | |
| 2004/0165590 A1 * | 8/2004 | Reiner et al. | 370/392 |
| 2005/0063370 A1 * | 3/2005 | Beshai et al. | 370/360 |
| 2005/0117575 A1 | 6/2005 | Konda | |
| 2005/0125590 A1 * | 6/2005 | Li et al. | 710/317 |

(Continued)

FOREIGN PATENT DOCUMENTS

EP    1 187 403 A2    3/2002

(Continued)

OTHER PUBLICATIONS

International Search Report and Written Opinion for Application No. PCT/GB2009/001521 dated Aug. 19, 2009 (13 pages).

(Continued)

*Primary Examiner* — Chirag Shah
*Assistant Examiner* — Daniel Mitchell
(74) *Attorney, Agent, or Firm* — Barnes & Thornburg LLP

(57) ABSTRACT

A switching device comprising a plurality of ingress ports and a plurality of egress ports. The switching device is arranged to receive data packets through the ingress ports and to forward received data packets to respective ones of the egress ports. The switching device further comprises an ingress module for each of the ingress ports, each ingress module being arranged to receive data packets from a respective single one of the ingress ports and to store the received data packets in one of a plurality of data structures provided by the ingress module, each ingress module being further configured to select a data packet from one of the plurality of data structures, and to request permission to transmit the selected data packet to an egress port. The switching device also comprises at least one egress module arranged to receive a plurality of requests for permission to transmit data packets through a particular egress port, the request being generated by the plurality of ingress modules, and to select one of the plurality of requests.

29 Claims, 14 Drawing Sheets

U.S. PATENT DOCUMENTS

| | | | |
|---|---|---|---|
| 2005/0135398 A1 | 6/2005 | Muthukrishnam et al. | |
| 2005/0163127 A1 | 7/2005 | Choi et al. | |
| 2006/0209693 A1* | 9/2006 | Davari et al. | 370/232 |
| 2007/0253439 A1* | 11/2007 | Iny | 370/413 |

FOREIGN PATENT DOCUMENTS

| | | |
|---|---|---|
| EP | 1 835 672 A1 | 9/2007 |
| GB | 2 272 820 A | 5/1994 |
| WO | WO 97/04543 | 2/1997 |
| WO | WO 99/40754 | 8/1999 |
| WO | WO 2004/032437 A2 | 4/2004 |
| WO | WO 2005/045633 A2 | 5/2005 |
| WO | WO 2007/125527 A2 | 11/2007 |

OTHER PUBLICATIONS

United Kingdom Search Report for Application No. GB0812404.2 dated Jan. 9, 2009 (5 pages).

McKeown, Nick, "The *i*SLIP Scheduling Algorithm for Input-Queued Switches", *IEEE/ACM Transactions on Networking*, vol. 7, No. 2, pp. 188-201 (Apr. 1, 1999).

* cited by examiner

SWITCHING METHOD

The present application claims priority, under 35 U.S.C. §119(a), to United Kingdom National Application No. 0812404.2, filed Jul. 7, 2008, which is hereby incorporated by reference herein.

The present invention relates to a method of switching data packets between a plurality of ingress ports and a plurality of egress ports of a switching device.

It is often necessary to send data between devices in a computer system, for example it is often necessary to connect a processing device to a plurality of input and output devices. Appropriate data communication is achieved by connecting the devices in such a way as to allow them to send data to each other over a physical link, which may be a wired link or a wireless link.

It is known in the art to use a switch to route data packets from the outputs of one or more devices to inputs of one or more other devices. Such a switch comprises one or more ingress ports arranged to allow the data packets to be received by the switch, and a plurality of egress ports arranged to allow the data to be transmitted from the switch.

Circumstances may arise where particular data cannot be transmitted from the switch. This may occur where there is insufficient bandwidth or credit on a connecting link or where a receiving device is busy processing previously received data such that data received at a switch cannot be sent from the switch to a receiving device through the appropriate egress port. Switches may therefore contain a buffer to store data packets waiting to be transmitted from the switch through an appropriate egress port. It is known to store data in such a buffer in the form of one or more queues which temporarily store data received from a sending device until that data can be sent to a receiving device. These buffers often comprise memory arranged as FIFO (first in, first out) queues.

The problems and complexities of data switch design are well known in the networking and data communication art. There are many conflicting requirements that make the perfect all-purpose solution impractical to achieve. Such conflicting requirements include the need for high link speeds, the need for minimal or zero loss of data, the need for maximal throughput to achieve high bandwidth utilisation, the need for fairness in the allocation of resources, the need for controllable quality of service, the need for scalability of design, and the need to minimise cost through minimising design resources and complexity. Typically, optimising performance conflicts with minimising cost, so that design compromises need to be made based on specific application requirements.

Shared input/output (I/O) is one application for data switching. Sharing of I/O devices can lead to better resource utilisation, scalability, ease of upgrade, and improved reliability. Since cost saving is a major driver in the acceptance of I/O sharing, it is important that the cost of the data switch is minimised to ensure the cost of the switch does not offset the cost advantages provided by I/O sharing. A significant challenge faced in the design of shared I/O switches is to minimise the cost of the switch while balancing the other requirements described above.

A wide variety of switch architectures are used in the networking and data communications art. Particularly, while crossbar based switches are prevalent, the arrangement of buffering resources within switches varies. Output buffered switches contain a buffer at each egress port. Generally speaking, output buffered switches minimize congestion and maximise throughput, but are not practical for high speed applications due to limitations in scalability. Input buffered switches allow for better scaling but often suffer from congestion due to head-of-line blocking.

It is known to overcome the drawbacks of head-of-line blocking using virtual output queues. Virtual output queuing requires that each ingress port maintains a separate buffer for each egress port. Whilst virtual output queuing resolves congestion caused by head-of-line blocking, the number of buffers required can become extremely large. Where there is a plurality of ingress buffers storing data to be sent to a particular egress port, it is necessary to decide from which buffer the next data packet will be sent. This is known as arbitration. As the number of ingress buffers at each ingress port and the number of ingress ports increases, arbitrating between those buffers becomes increasingly complex, as the size of a switch arbiter is roughly proportional to the square of the number of inputs to that arbiter. Furthermore, the large numbers of cross-chip interconnects required to centrally arbitrate between a large number of buffers can cause major chip layout issues.

Arbitration is therefore an important issue in switch design, and many different arbitration schemes have been proposed. However, these frequently suffer from excessive complexity. Complexity generally increases the size and hence cost of a switch design. While it has been appreciated that centralised arbitration may be disadvantageous, the solutions proposed heretofore have added complexity in other ways, for example by providing a series of arbiters having relatively complex control paths between one another, so that information can be passed between arbiters for use in arbitration decisions. Indeed, many existing distributed arbitration schemes use feedback mechanisms which introduce delays at each phase, thereby affecting the throughput of the switch. While problems inherent in the use of feedback mechanisms have been addressed through the use of pipelining, this results in larger chip sizes, which in turn results in increased cost.

It is an object of an embodiment of the present invention to obviate or mitigate one or more of the problems outlined above.

According to a first aspect of the present invention, there is provided a switching device comprising a plurality of ingress ports and a plurality of egress ports. The switching device is arranged to receive data packets through said ingress ports and to forward received data packets to respective ones of said egress ports. The switching device further comprises:

an ingress module for each of said ingress ports, each ingress module being arranged to receive data packets from a respective single one of said ingress ports and to store the received data packets in one of a plurality of data structures provided by the ingress module, each ingress module being further configured to select a data packet from one of said plurality of data structures and to request permission to transmit the selected data packet to an egress port; and at least one egress module arranged to receive a plurality of requests for permission to transmit data packets through a particular egress port, the requests being generated by a plurality of ingress modules, and to select one of said plurality of requests.

The provision of independent ingress modules for each of the ingress ports allows arbitration to be carried out in a highly distributed manner. Indeed, given that each ingress module need only select from data structures associated with a particular ingress port, the complexity of each ingress module is minimised.

Furthermore, the use of both ingress and egress modules allows each ingress module to select a data packet received through a particular ingress port that is to be forwarded to a relevant egress module, and the relevant egress module to select between ingress modules. In this way arbitration is distributed, but distribution is achieved in such a way that ingress and egress modules can act independently of one another, thereby obviating the need for feedback as in some prior art arrangements.

Further, while testing is a significant problem with some known arbitration techniques, the simplicity of each ingress module allows testing of individual ingress modules to be effectively carried out.

Each of the ingress modules may be arranged to select a data packet from one of said data structures independently of operation of others of said ingress modules, and independently of operation of said at least one egress module. In this way, the need to mange interaction between ingress modules is obviated, given that each ingress module is arranged to operate independently.

The egress module may be arranged to select one of said plurality of requests independently of operation of said ingress modules. Therefore, the complexity of the arrangement is minimised given that the need to manage interaction between the egress module and the ingress modules is removed.

It is preferred that a plurality of egress modules are provided, each egress module being arranged to receive requests for permission to transmit data packets through a respective single one of said egress ports from a plurality of said ingress modules, and to select one of said plurality of requests. Where a plurality of egress modules are provided in this way, the arbitration is further distributed given that each ingress module can work to select a data packet to be forwarded from one of a plurality of data structures associated with a particular ingress port and each egress module is concerned only with data packets to be transmitted through a particular one of the egress ports.

Each egress module may be arranged to select one of said plurality of requests independently of operation of others of said plurality of egress modules. Again, this allows the egress modules to operate independently of one another and therefore minimises the complexity of the overall arrangement.

Each of the egress modules may be arranged to provide data (sometimes referred to as "credit information") indicating whether requests for permission to transmit data packets through the respective egress port should be made by said ingress modules. In this way, the ingress modules can readily determine whether requests for permission to transmit a data packet to a particular egress port should be made. The use of credit information in this way ensures that packets selected to be offered for transmission are capable of being accepted by the relevant egress arbiter. This has the effect of optimising ingress arbitration.

The credit information indicating whether requests for permission to transmit data packets should be made may take any convenient form. For example, the credit information may take the form of a single bit flag such that if the flag has a first value, requests should be made, while if the flag has a second value requests should not be made. Alternatively, the credit information may comprise data indicating a maximum size of data packet which should be associated with any request. The use of data indicating a maximum size of data packet which should be associated with any request allows data packets of varying sizes to be used, and allows an ingress module to better determine whether a particular data packet should form the basis of a request. As a further alternative, the credit information may indicate a maximum quantity of data which an egress module can accept.

Each of the ingress modules may be arranged to determine whether requests for permission to transmit data packets through a particular egress port should be made based upon said data provided by a respective one of said egress modules. For example, each ingress module may be arranged to determine an egress port to which a selected data packet is to be forwarded, determine whether a request should be made to an egress module associated with the determined egress port for permission to send the selected data packet to the determined egress port, and if it is determined that a request should be made, make a request to the egress module associated with the determined egress port.

Having made a request, an ingress module can await grant of that request by the relevant egress module. If the request is granted, the data packet can then be transmitted to the relevant egress port. In one embodiment of the invention a function other than an egress module, for example a congestion manager, may issue a "dummy" grant signal after a predetermined time period to complete the arbitration cycle. This ensures the arbitration process remains efficient. In this circumstance a packet being offered for transmission may remain in a particular one of the ingress buffers or may be moved to another storage means and re-offered for transmission at a later time, as determined by an independent congestion management function.

If it is determined that a request should not be made to a particular egress port, an ingress module may be arranged to select a further data packet, determine an egress port to which the selected further data packet is to be forwarded, determine whether a request should be made to the egress module associated with the determined egress port for permission to send the selected further data packet to the determined egress port, and if it is determined that a request should be made, make a request to the egress module associated with the determined egress port At least some of said ingress modules may be arranged to generate a plurality of requests to transmit data packets, each of said plurality of requests being directed to different egress modules, and each of said plurality of requests being generated before a response has been received to a first of said plurality of requests. In this way, congestion is avoided, given that the prospects of at least one request being accepted are increased.

In one embodiment, multiple queues may be provided at an ingress module, and at the head of each may be packets for the different egress ports. Of those egress ports only some may have available credit, limiting choices which the ingress arbiter may make. If data packets at the heads of the various queues are destined for different egress ports with credit, then requests can be made to more than one of the egress ports, although the number of requests which can be made at any one time is preferably limited so as to achieve the benefits of allowing multiple requests, without introducing excessive complexity.

Each egress module may comprise a buffer to store data packets to be transmitted from the associated egress port, for example a single packet buffer. While such buffering may be unnecessary in some embodiments of the invention, its provision can be useful in minimising the effects of congestion, by allowing a packets to be received at the egress arbiter without interruption, and also by providing buffering to deal with issues arising from the use of differing data transmission rates.

The data structures provided by the ingress modules may be queues, for example first in, first out (FIFO) queues. Where FIFO queues are used, selection of a data packet from a particular queue involves selecting a data packet from the head of the particular queue.

The switching device may be adapted to connect a plurality of computing devices to a plurality of input/output devices.

As such, the switching device may be used to allow a plurality of computers to share I/O devices for the purposes of I/O virtualization.

The switching device may be a PCI Express switching device. PCI Express is a device interface format designed to replace existing PCI and PCI-X device interfaces. With PCI and PCI-X, each device is connected to a motherboard by way of a shared bus, placing restrictions on the bandwidth that a device can use, as each device must wait for space on the shared bus. PCI Express is designed around a shared switch rather than a shared bus, with each device having its own direct access to the switch via a link. The switch then routes traffic between communicating devices. The switching device described herein is particularly applicable (but not limited) to systems based upon the PCI Express protocol.

According to a second aspect of the present invention, there is provided a switching device comprising a plurality of ingress ports and a plurality of egress ports. The switching device is arranged to receive data packets through said ingress ports and to forward received data packets to respective ones of said egress ports. The switching device further comprises:

a dedicated associated egress module for each egress port, each egress module being arranged to indicate to a plurality of sources of data packets whether requests for permission to send data packets should be sent to the egress module, to receive requests for permission to send data packets, and to transmit data in response to said requests.

The term "dedicated" is used to indicate that each egress module is concerned only with a single egress port, and does not affect operation of other egress ports.

Providing a dedicated egress module for each egress port allows the complexity of the egress module to be minimised. More specifically, given that as described above the complexity of an arbiter is affected by its number of inputs, providing a plurality of egress modules allows each egress module to be implemented in an efficient manner, given that each egress module need only be concerned with the selection of data packets which are to be transmitted to a particular egress port.

Each of the egress modules may be arranged to indicate whether requests for permission to send data packets should be sent to that egress module independently of operation of others of said egress modules.

It is preferred that a switching device in accordance with the second aspect of the invention further comprises an ingress module for each ingress port, each ingress module being arranged to process data packets received through a single one of said ingress ports. Again, the provision of independent ingress modules for each ingress port allows complexity benefits to be realised.

Each ingress module may comprise at least one data structure for storing data packets received through the respective ingress port. Each ingress module may be arranged to select a data packet stored in said at least one data structure to be forwarded to an egress port. In one embodiment, each ingress module comprises a plurality of data structures for storing data packets received through a respective ingress port, and selecting a data packet further comprises selecting a data structure from which a data packet should be selected for forwarding to an egress port.

It will be appreciated that aspects of the present invention can be implemented in any convenient way including by way of suitable hardware and/or software. For example, a switching device arranged to implement the invention may be created using appropriate hardware components. Alternatively, a programmable device may be programmed to implement embodiments of the invention. The invention therefore also provides suitable computer programs for implementing aspects of the invention. Such computer programs can be carried on suitable carrier media including tangible carrier media (e.g. hard disks, CD ROMs and so on) and intangible carrier media such as communications signals.

Embodiments of the present invention are now described, by way of example, with reference to the accompanying drawings in which.

Figure 1:
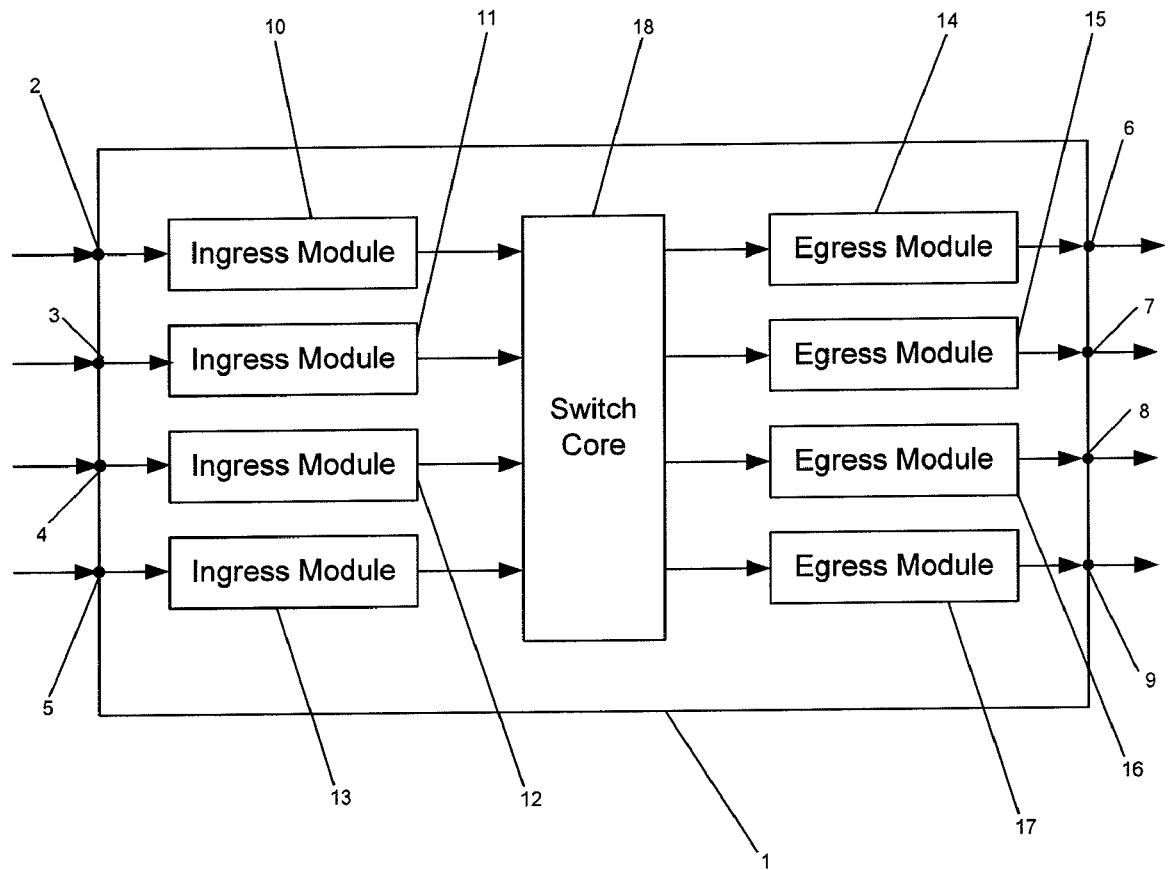
FIG. 1 is a schematic representation of a switch according to an embodiment of the present invention, having four ingress ports and four egress ports.

FIG. 1 schematically illustrates a switch according to an embodiment of the present invention. A switch 1 has four ingress ports 2, 3, 4, 5 and four egress ports 6, 7, 8, 9. The ingress ports 2, 3, 4, 5 have respective associated ingress modules 10, 11, 12, 13. The egress ports 6, 7, 8, 9 have respective associated egress modules 14, 15, 16, 17. A switch core 18 connects the ingress modules 10, 11, 12, 13 to the egress modules 14, 15, 16, 17. Data packets are received through the ingress ports 2, 3, 4, 5 and processed by the ingress modules 10, 11, 12, 13 before being switched to an appropriate egress port by the switch core 18, via the appropriate egress module 14, 15, 16, 17.

The ingress modules 10, 11, 12, 13 are now described in further detail with reference to FIG. 2. Whilst the following description refers specifically to the ingress module 10, it will be appreciated that the description applies similarly to the other ingress modules 11, 12, 13.

Figure 2:
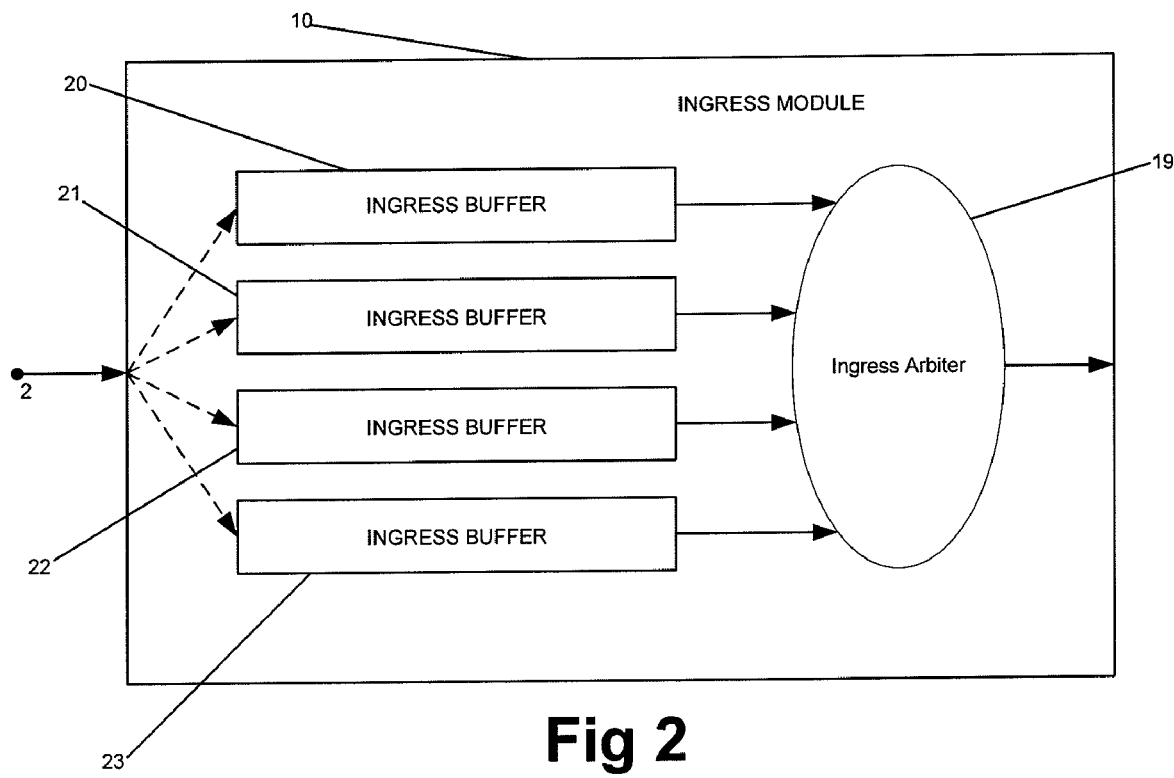
FIG. 2 is a schematic representation of an ingress module of the switch of FIG. 1.

Referring to FIG. 2, it can be seen that the ingress module 10 comprises four ingress buffers 20, 21, 22, 23 arranged to store data packets received at the ingress port 2. The ingress buffers 20, 21, 22, 23 may, for example, be implemented as virtual output queues, wherein each of the ingress buffers is associated with one of the egress ports 6, 7, 8, 9 such that packets received at the ingress port 2 destined for a particular egress port are stored in the appropriate ingress buffer. In an alternative embodiment, the ingress buffers may be shared buffers, wherein packets are added to the ingress buffers 20, 21, 22, 23 according to an appropriate scheduling scheme. The ingress buffers may be arranged as first-in, first-out queues, or in any other appropriate arrangement.

The ingress module 10 further comprises an ingress arbiter 19 arranged to arbitrate between the ingress buffers 20, 21, 22, 23. The arbiter 19 selects one of the ingress buffers 20, 21, 22, 23 and selects a data packet from the selected ingress buffer for transmission to an egress port determined by the selected packet. Where the ingress buffers 20, 21, 22, 23 are implemented as queues, selection of a packet from a selected queue simply comprises selection of the data packet at the head of the queue.

Figure 3:
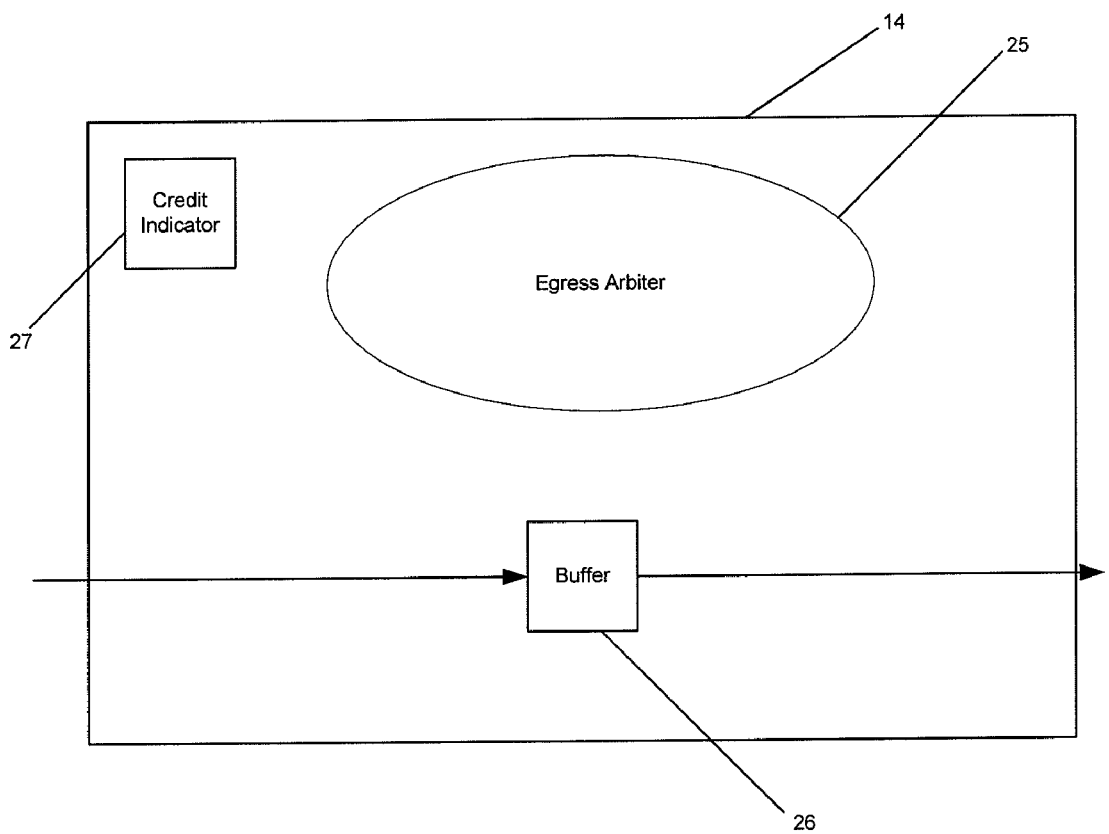
FIG. 3 is a schematic representation of an egress module of the switch of FIG. 1.

FIG. 3 schematically illustrates the egress module 14. It is to be appreciated that the other egress modules 15, 16, 17 are similarly implemented. It can be seen that the egress module 14 comprises an egress arbiter 25 arranged to select a data packet offered by one of the ingress modules 10, 11, 12, 13 for transmission to the egress port 6. The egress module 14 further comprises a single packet buffer 26 to store an incoming data packet received from an ingress module. In some cases it is not necessary for an egress module to have a buffer, as data packets can be forwarded to the relevant egress port immediately without storage at the egress module. The use of the single packet buffer 26 may be beneficial however, to allow the switch core 18 to complete a data packet transfer in the event that there is a problem with the link from an egress port, causing a transient delay in transmitting a data packet from that egress port. Where single packet buffering is implemented in the egress module by storing the data packet in the single packet buffer 26, the switch core can complete the transfer of the data packet to the egress module, and the egress module can forward the data packet from the egress port when the problem with the link has cleared. Additionally, the provision of the single packet buffer 26 is useful where data is received at an egress port at a different transmission rate to that at which it is transmitted from the egress port. In such a case the single packet buffer 26 can buffer a received data packet so as to allow the differing transmission rates to be properly handled.

A credit state indicator 27 is set by the egress module 14 to indicate whether the egress module 14 has sufficient credit to receive a data packet. In this embodiment, the credit state indicator is a simple binary flag, where a value of '0' indicates that the egress module 14 is not able to receive a data packet, and a value of '1' indicates that the egress module 14 is able to receive a data packet. In other embodiments, the credit state indicator may indicate a quantity of credit an egress module has available, which can be compared with the size of a particular data packet to determine if that egress module can accept that particular data packet.

Figure 4:
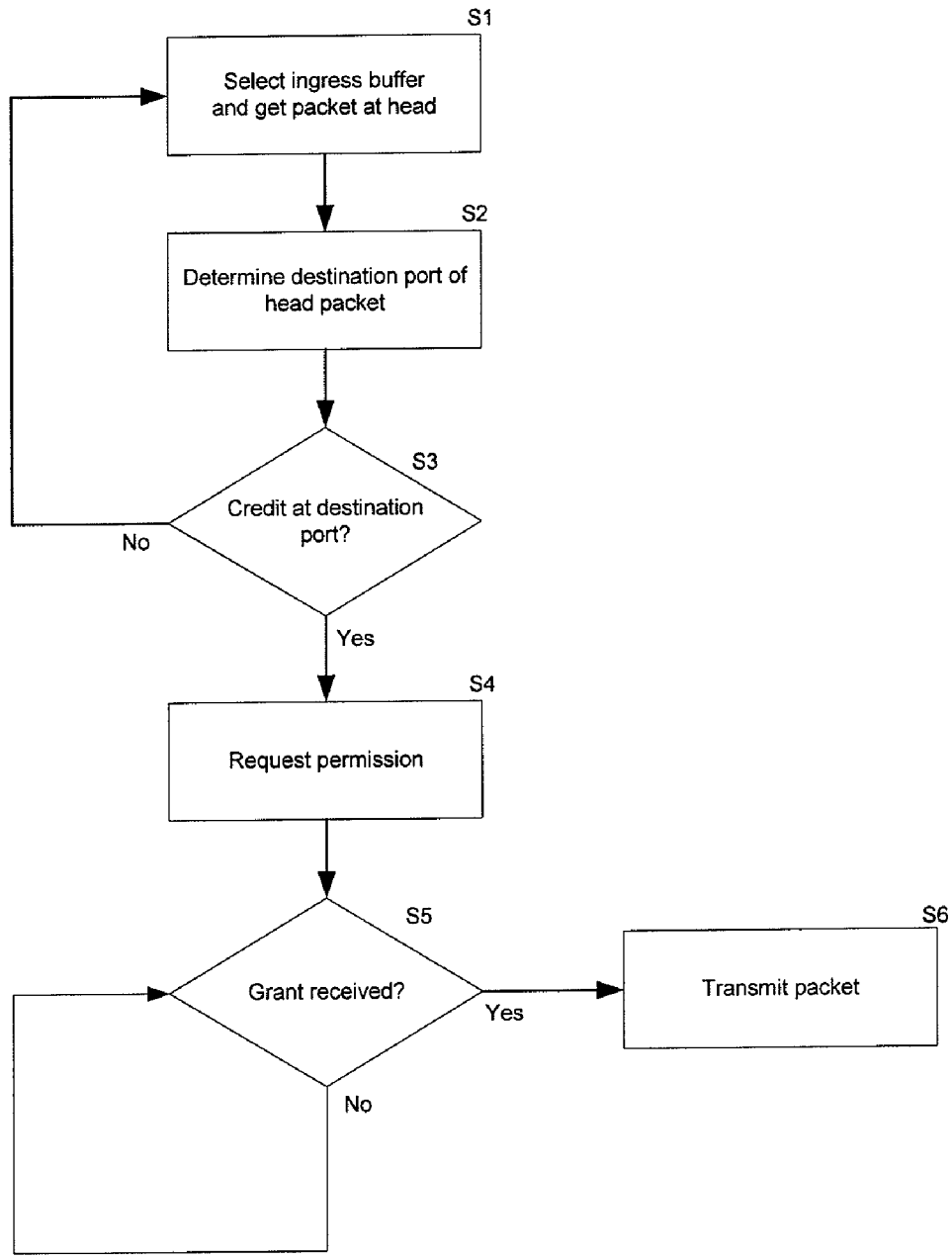
FIG. 4 is a flow chart showing the processing performed by an ingress module of the switch of FIG. 1 in an embodiment of the present invention.

An arbitration strategy is now described in more detail with reference to FIGS. 4, 5 and 6. FIG. 4 shows processing carried out by the ingress module 10.

Referring to FIG. 4, at step S1, the ingress arbiter 19 selects one of the ingress buffers 20, 21, 22, 23 to be processed. Selection of ingress buffers by the ingress arbiter may be a simple round-robin selection, although any other appropriate data selection algorithms may be used, for example weighted round-robin. In the described embodiment each of the ingress buffers 20, 21, 22, 23 is implemented as a queue and the data packet at the head of the selected queue is therefore selected for processing before processing passes to step S2. At step S2 the ingress arbiter 19 determines for which egress port the selected data packet is destined using information in the header of the data packet. Processing then passes to step S3.

At step S3, the ingress arbiter 19 determines if there is credit available at the egress module associated with the specified destination egress port by examining the credit state indicator of that egress module (for example, the state credit state indicator 27 of egress module 14 where the processed packet is destined for the egress port 6). If it is determined that there is no credit available at the relevant egress module, processing passes back from step S3 to step S1, and a further ingress buffer 20, 21, 22, 23 is selected to provide a data packet for forwarding to an egress port. If, on the other hand, it is determined at step S3 that there is credit available at the relevant egress module, processing passes from step S3 to step S4 where the ingress arbiter 19 sends the egress module associated with the destination egress port a request for permission to send the selected data packet to the relevant egress port. Processing then passes to step S5.

At step S5, the ingress arbiter 19 determines if it has received a grant signal from the relevant egress module indicating that the ingress module 10 should transmit the selected data packet to the relevant egress module. If a grant signal has been received, processing passes to step S6 and the ingress arbiter 19 causes transmission of the selected data packet to the relevant egress module via the switch core 18. If, on the other hand, a grant signal has not been received, processing remains at step S5 until a grant signal is received.

In some embodiments, where a grant signal is not received from the relevant egress module within a predetermined time period, a congestion manager may issue a "dummy" grant signal so as to improve the efficiency of the arbitration process, and avoid the ingress arbiter waiting excessively long times at step S5 for a grant signal to be received. In such a case the data packet selected at step S1 may remain in its ingress buffer, or alternatively may be moved to another one of the ingress buffers by the congestion manager. In either case, the selected data packet is not transmitted at step S6 in response to the "dummy" grant signal, but remains in one of the ingress buffers and is offered for transmission at a future time.

Each of the ingress modules 10, 11, 12, 13 (and their corresponding ingress arbiters) act independently of one another. That is, ingress arbiter 19 only arbitrates between ingress buffers 20, 21, 22, 23. Similarly, the ingress arbiter of ingress module 11 only arbitrates between the ingress buffers of ingress module 11, the ingress arbiter of the ingress module 12 only arbitrates between the ingress buffers of the ingress module 12, and the ingress arbiter of the ingress module 13 only arbitrates between the ingress buffers of the ingress module 13. As such, it is possible that more than one ingress arbiter will each request to send a data packet to the same egress port. As each egress arbiter only selects one data packet at a time (as is described below with reference to FIG. 6), only one ingress arbiter is able to send a data packet to a particular egress port at any one time, resulting in transitory congestion. To mitigate such congestion, it is preferable that each ingress arbiter offers a data packet to more than one egress port simultaneously so as to improve the chances that at least one request is granted. Where this is the case, it is important to ensure that an ingress arbiter's simultaneously offered data packets are destined for different egress ports. The number of simultaneous data packets offered by an ingress arbiter will be application dependent, accounting for the requirements of performance, size and complexity.

Figures 5, 5A:
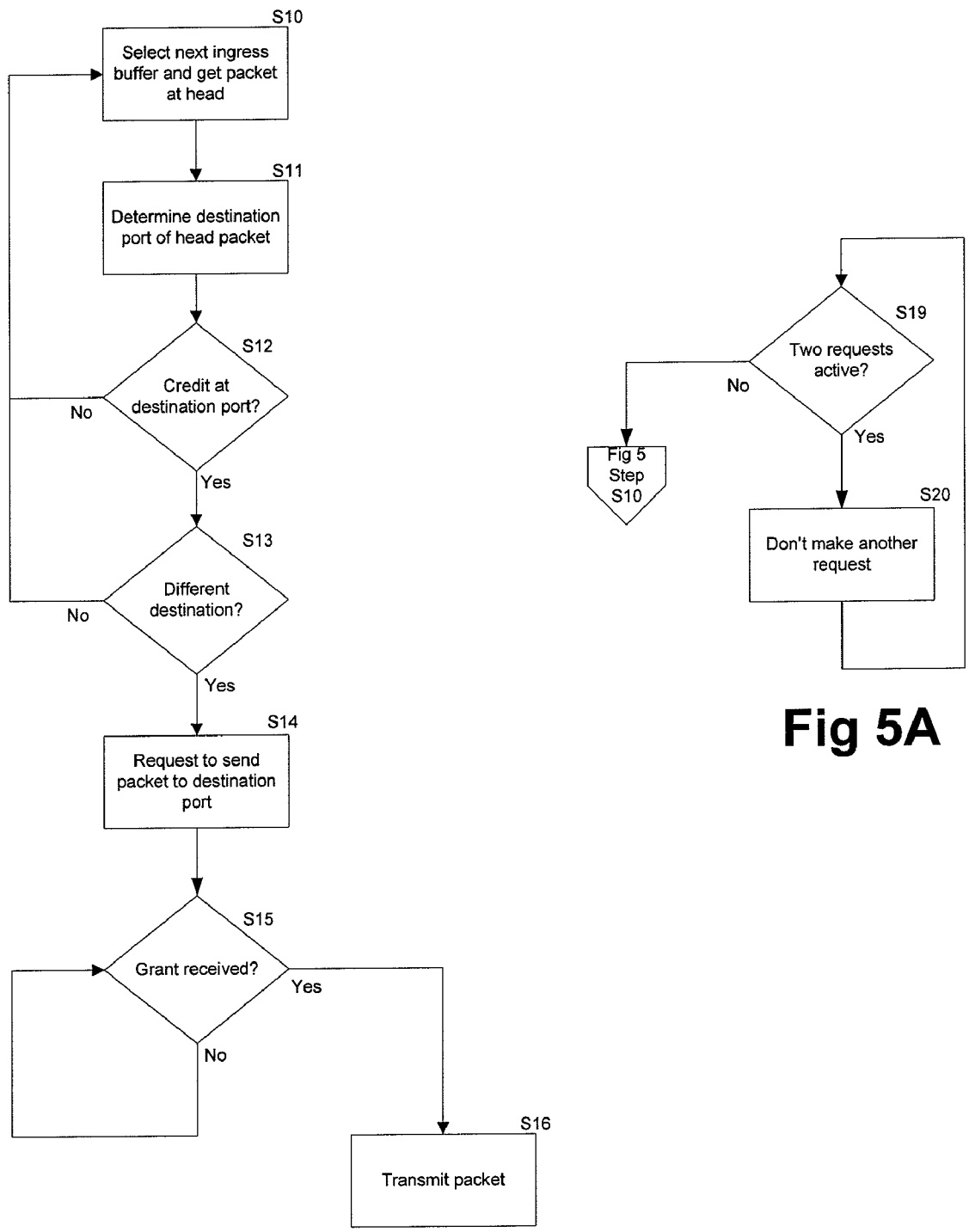
FIGS. 5 and 5A are flow charts showing the processing performed by an ingress module of the switch of FIG. 1 in a further embodiment of the present invention.

FIG. 5 illustrates the processing of ingress arbiter 19 in an embodiment in which two simultaneous requests to send data packets to an egress port are made.

The switching device 1 may use the PCI Express protocol. PCI Express links may comprise one or more bidirectional lanes, one direction for receiving data packets, the other for transmitting data packets. The number of lanes in a particular link is denoted by Nx, where N is the number of bidirectional lanes. For example, an 8x link has eight bidirectional lanes. Each link may be run at different data rates, for example, a standard data rate (SDR) of 2.5 Gb/s or a double data rate (DDR) of 5 Gb/s. The particular data rate of a particular link is dependent upon the bandwidth required for the particular application along with the level of PCI Express support offered. Where the switching device 1 uses the PCI Express protocol, an ingress arbiter of a 4x ingress port may offer two simultaneous data packets, while an ingress arbiter of an 8× ingress port may offer four simultaneous data packets.

Referring to FIG. 5, the processing of steps S10, S11 and S12 is as described with reference to steps S1, S2 and S3 of FIG. 4. At step S13 a check is made to ensure that the destination egress port of the selected data packet is different to the destination egress port of any data packet which is the subject of another currently active request made by the ingress arbiter 19. If this is not the case, processing passes back to step S10, and the next ingress buffer is selected. If, on the other hand, it is determined that the destination egress port of the selected data packet is different to the destination egress port of any currently active requests (which will always be the case if there are currently no other active requests) processing passes to step S14.

At step S14, the ingress arbiter 19 sends a request to the egress module associated with the egress port specified by the selected data packet for permission to transmit the selected data packet to that egress module.

From step S14 processing passes to step S15. The processing of steps S15 and S16 is as described with reference to steps S5 and S6 of FIG. 4 such that if a grant signal is received, the selected data packet is transmitted at step S16.

The processing of FIG. 5A is carried out in parallel to that of FIG. 5 to ensure that two requests for permission to transmit remain active at any one time. More specifically, at step S19 it is determined if there are two currently active requests. The ingress arbiter is configured to make two simultaneous requests for permission to transmit data packets, therefore if it is determined that there are two currently active requests, processing passes to step S20 where a decision is taken not to make any further requests, before processing returns to step S19. If however the check of step S19 determines that there are not two currently active requests, processing passes to step S10 of FIG. 5 as described above.

From the preceding description and FIGS. 5 and 5A it can be seen that the processing of FIG. 5 is repeated so as to make a plurality of requests for permission to transmit a data packet. The processing of FIG. 5 includes a check at step S15 made to determine whether a request for permission to transmit a data packet has been granted. It will be appreciated that the requests made in the processing of FIG. 5 will be granted independently of one another. As such, where a first request is made before second request, the first and second requests can be granted in any order.

It will be appreciated that the processing of FIG. 5A can be easily modified to allow more than two requests to be active simultaneously.

The processing undertaken at the egress module 14 is now described with reference to FIG. 6. For simplicity and ease of understanding, the following description is not concerned with the size of data packets nor with amounts of egress credit of the egress module 14. Rather, the following description assumes that each data packet is a standard size and that an egress module 14 either has, or has not, got sufficient egress credit to receive a data packet. It will however be appreciated that in alternative embodiments of the invention, variable sized data packets may be used and in such a case the egress module may provide an indication of an amount of credit rather than a simple binary flag.

Figure 6:
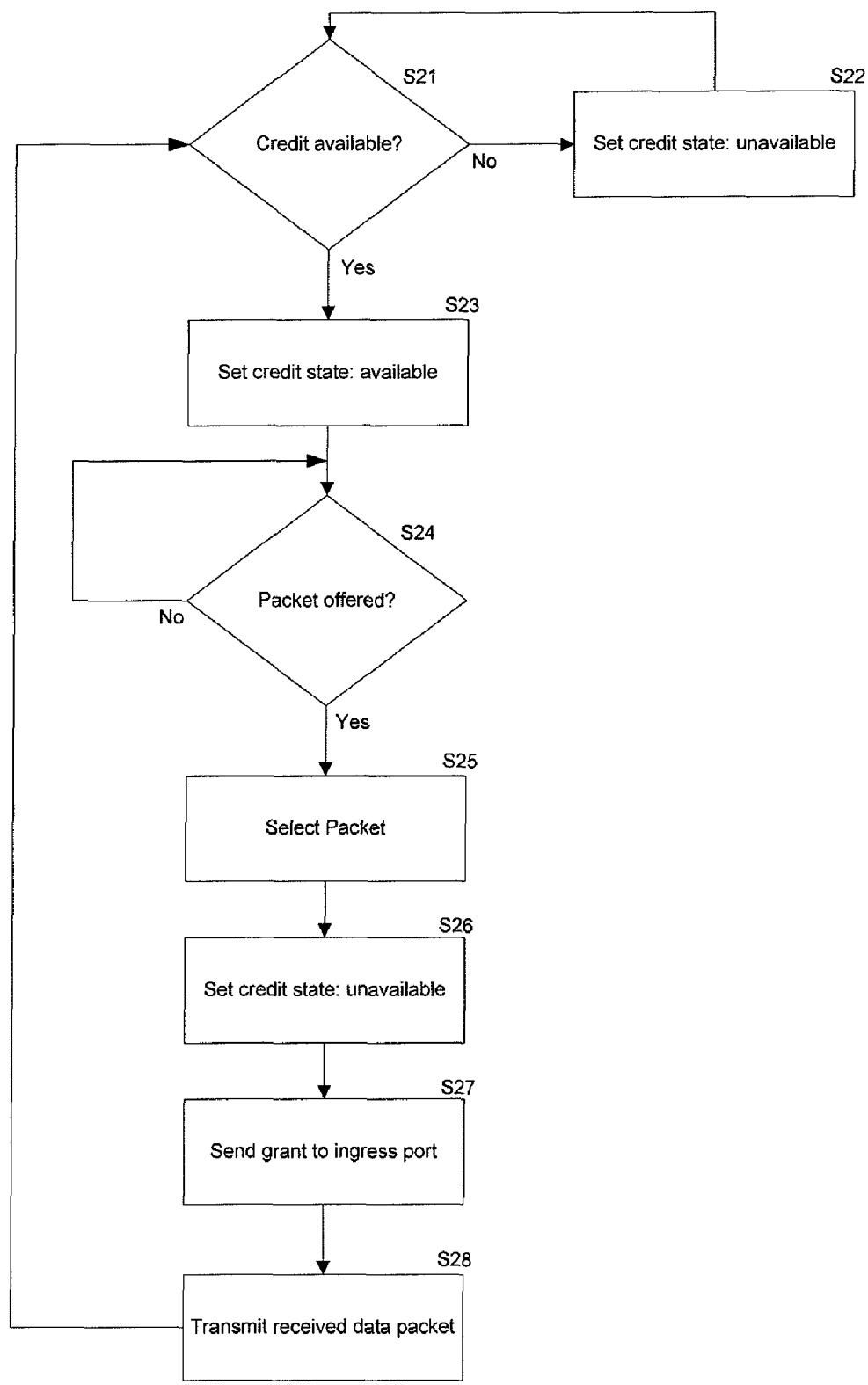
FIG. 6 is a flow chart showing the processing performed by an egress module of the switch of FIG. 1 in an embodiment of the present invention.

Referring to FIG. 6, at step S21 the egress arbiter 25 determines if the egress module 14 has sufficient credit to receive a new data packet. If it is determined that the egress module 14 does not have sufficient credit to receive a new data packet (e.g. if it is currently transmitting a data packet, or receiving a packet from another ingress port), the egress arbiter 25 signals to all of the ingress modules that there is insufficient credit by setting the credit state indicator 27 to a value of '0' at step S22. Processing passes from step S22 back to step S21, and the credit state indicator 27 maintains the value of '0' until sufficient egress credit becomes available at the egress module 14. If, on the other hand, it is determined at step S21 that the egress module 14 does have sufficient egress credit to receive a new data packet, the egress arbiter 25 signals to all of the ingress modules that there is sufficient egress credit at the egress module 14 by setting the credit state indicator 27 to a value of '1' at step S23. Processing then passes to step S24.

At step S24 the egress arbiter 25 determines if any of the ingress modules have requested permission to send a data packet to the egress module 14. Processing remains at step S24 until this condition is satisfied, as indicated by the process flow arrow back to step S24. When it is determined that there are one or more requests for permission to send a data packet from one or more ingress arbiters, the egress arbiter 25 chooses one of the ingress modules requesting to send a data packet at step S25. The selection of an ingress module by the egress arbiter 25 may be carried out using any arbitration technique, such as simple round-robin arbitration. As the egress arbiter 25 is to receive a data packet from the selected ingress module, at step S26 the egress arbiter 25 notifies the ingress modules if it does not have sufficient credit available to receive further data packets by setting the credit state indicator 27 to a value of '0', and processing passes to step S27. If an egress arbiter is configured to only receive a single data packet at a time, it will be appreciated that having selected a data packet at step S25, the credit state indicator will be set to a value of '0' at step S26. At step S27 the egress arbiter 25 sends a grant signal to the selected ingress arbiter and waits until the data packet is received. Once the data packet is received from the selected ingress arbiter, the received data packet is transmitted from the egress port 6 at step S28. Processing then passes back to step S21.

An example of the processing described with reference to FIGS. 5 and 6 is now presented with reference to FIGS. 7 to 13. It is again assumed that each ingress port 2, 3, 4, 5 is connected to a 4× link, and that each ingress arbiter offers two data packets to different egress ports simultaneously as described above. For simplicity and ease of understanding, FIGS. 7 to 13 only show a single ingress module, the ingress module 10. To further aid understanding, FIGS. 7 to 13 do not show the ingress arbiter 19 of the ingress module 10. The ingress module 10 is shown with the ingress buffers 20, 21, 22, 23 as described above. The egress module 14 is shown with the credit state indicator 27 and the egress arbiter 25 as described above. The single packet buffer is omitted for the sake of clarity. The egress module 15 has a credit state indicator 28 and an egress arbiter 29, the egress module 16 has a credit state indicator 30 and an egress arbiter 31, and the egress module 17 has a credit state indicator 32 and an egress arbiter 33. In the described embodiment the ingress arbiter 19 uses round-robin arbitration to select between the ingress buffers 20, 21, 22, 23, and each of the ingress buffers 20, 21, 22, 23 is implemented as a FIFO queue. Ingress buffers which are currently selected by the ingress arbiter 19 are shown with an emboldened outline. Each of the egress arbiters 25, 29, 31 and 33 also use round-robin arbitration to select between each of the ingress arbiters (only one of which is shown).

Figure 7:
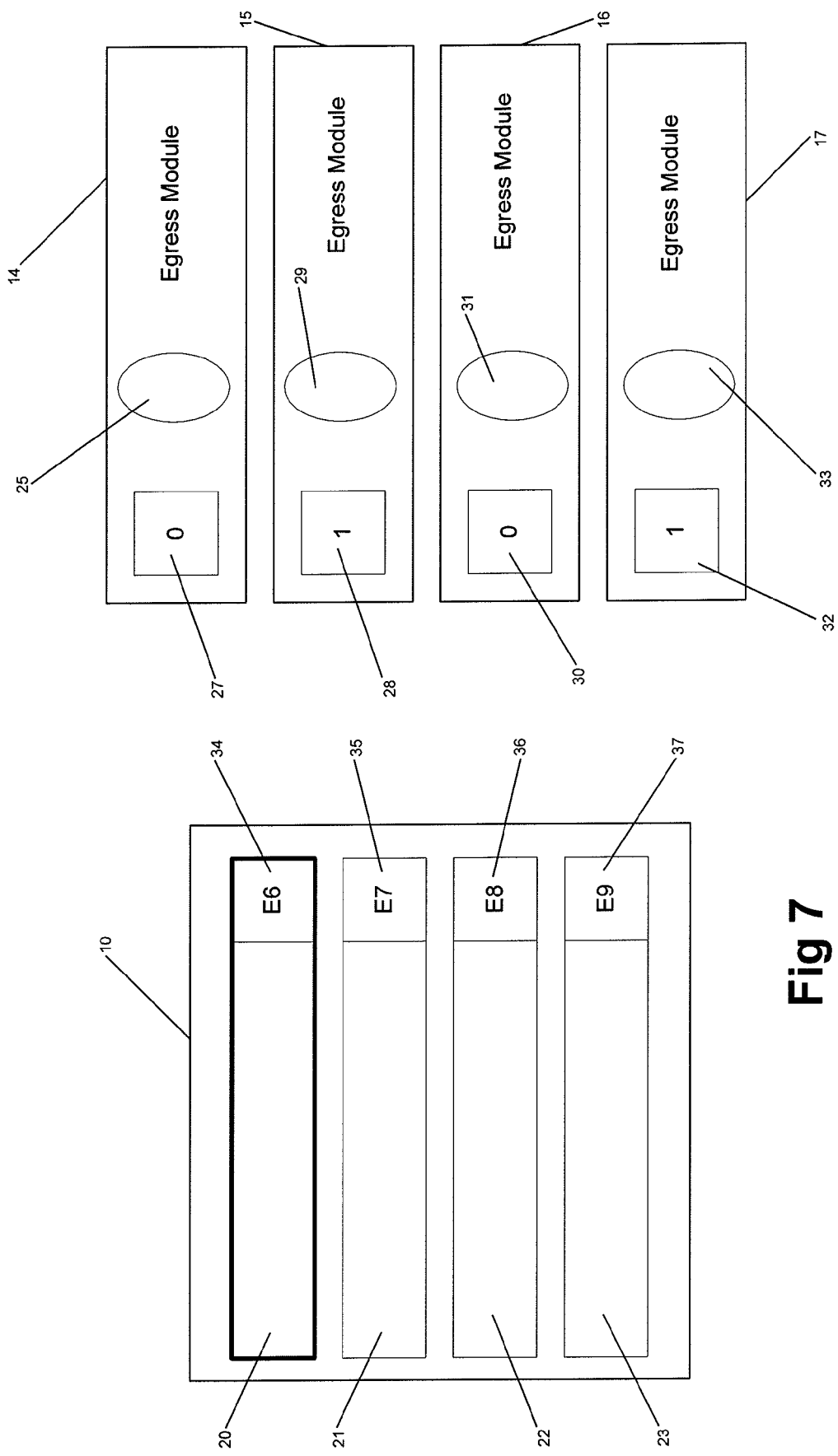
FIGS. 7 to 14 are schematic illustrations showing how ingress ports and credit state indicators of the switch of FIG. 1 are modified by the processing of FIGS. 5 and 6.

Referring to FIG. 7, it can be seen that the ingress buffer currently selected by the ingress arbiter 19 is the ingress buffer 20. A packet 34 at the head of the ingress buffer 20 is destined for the egress port 6 (denoted in FIG. 7 by the label E6). The credit state indicator 27 of the egress module 14 associated with the egress port 6 has a value of '0', indicating that the egress module 14 has insufficient credit to receive a new data packet. Ingress arbiter 19 of the ingress module 10 therefore selects a next ingress buffer using round-robin scheduling.

Figure 8:
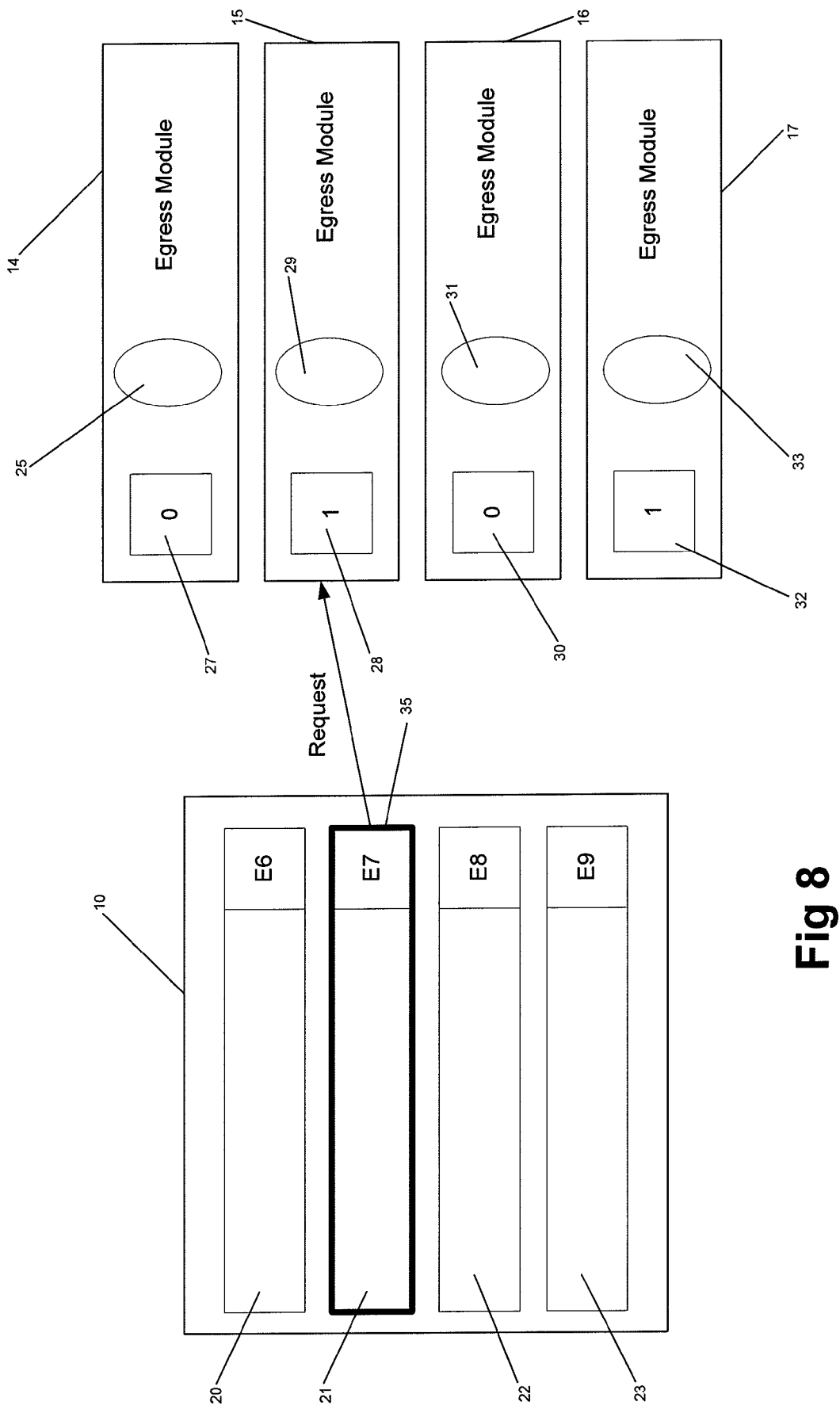

Referring to FIG. 8, it can be seen that the next ingress buffer selected by the ingress arbiter 19 is the ingress buffer 21. A data packet 35 at the head of ingress buffer 21 is destined for egress port 7 (denoted in FIG. 8 by the label E7). The credit state indicator 28 of egress module 15 associated with the egress port 7, has a value of '1', indicating that there is sufficient credit for egress module 15 to receive a new data packet. Ingress arbiter 19 therefore sends a request signal to the egress module 15, to indicate that there is a data packet waiting to be sent to the egress port 7.

Figure 9:
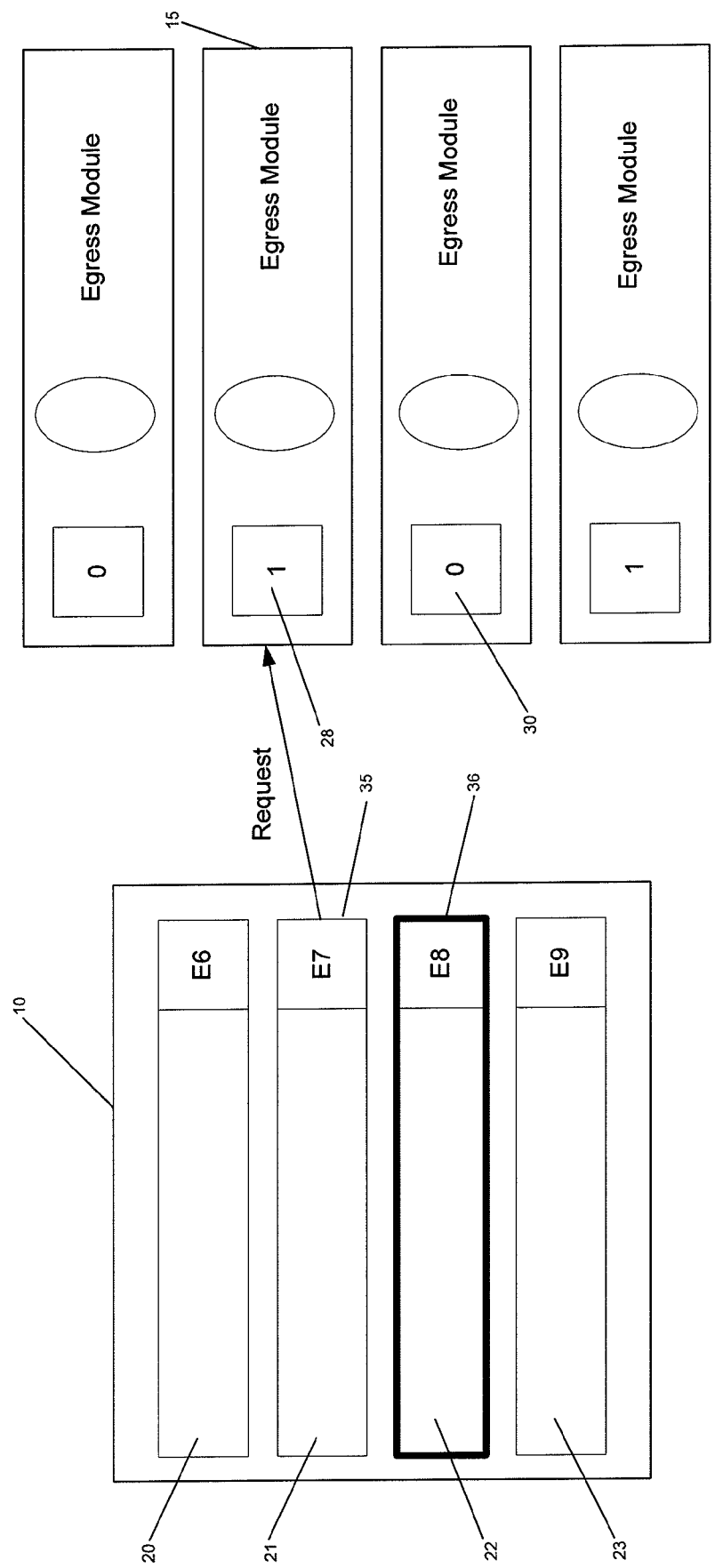

Referring to FIG. 9, it can be seen that the next ingress buffer selected by the ingress arbiter 19 is the ingress buffer 22. A data packet 36 at the head of the ingress buffer 22 is destined for egress port 8. The credit state indicator 30 of egress module 16 associated with the egress port 8, has a value of '0', indicating that there is insufficient credit for the egress module 16 to receive a new data packet. Egress module 16 may have insufficient credit if, for example, it is currently transmitting a data packet received from another ingress buffer. Ingress arbiter 19 selects the next ingress buffer, the ingress buffer 23 as shown in FIG. 10.

Figure 10:
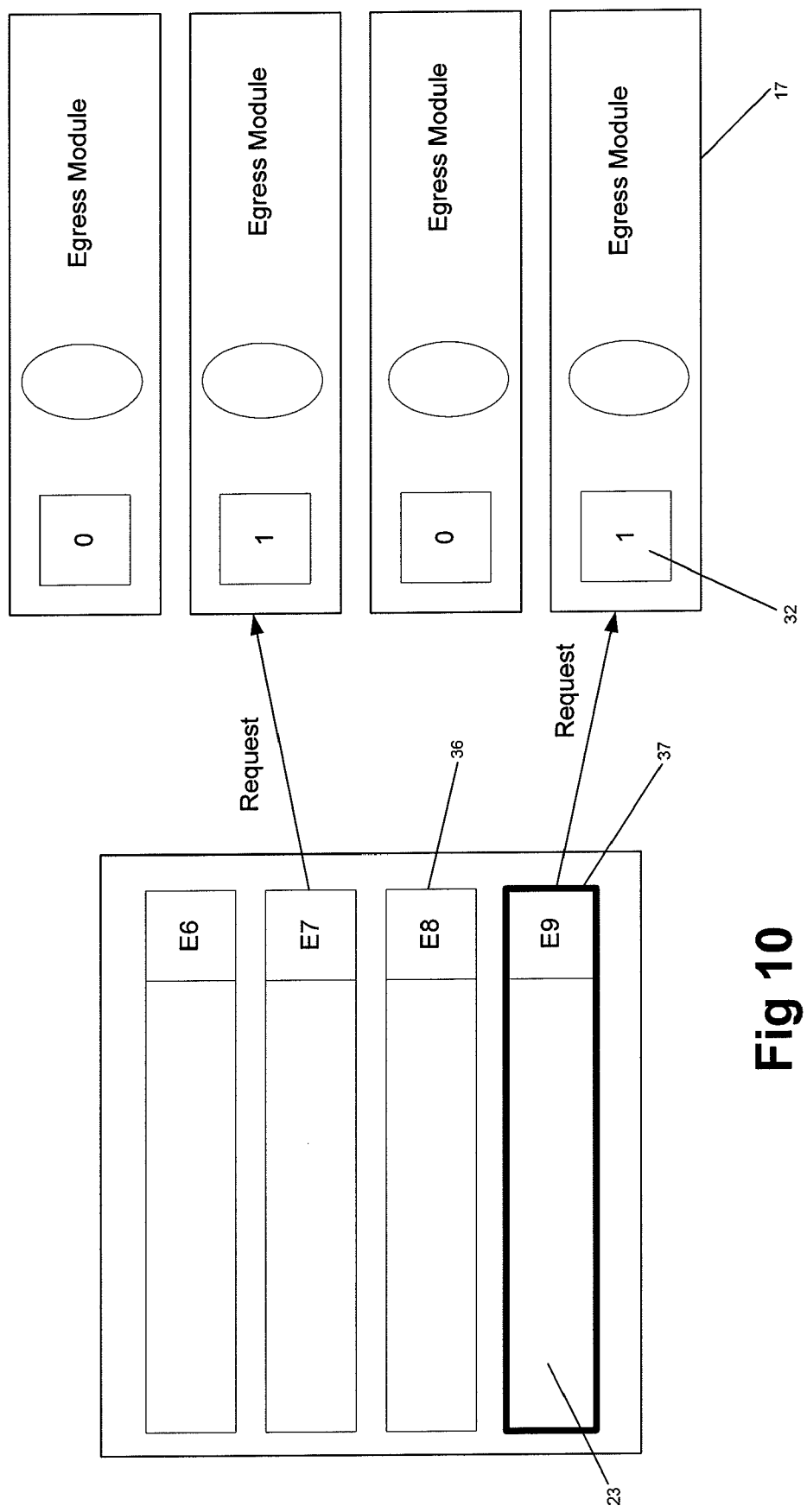

Referring to FIG. 10, a data packet 37 at the head of the ingress buffer 23 is destined for the egress port 9. The credit state indicator 32 of the egress module 17 associated with the egress port 9, has a value of '1', indicating that the egress module 17 has sufficient credit to receive a further data packet. The ingress arbiter 19 therefore sends a request signal to the egress module 17 to indicate that there is a data packet waiting to be sent to the egress port 9.

Figure 11:
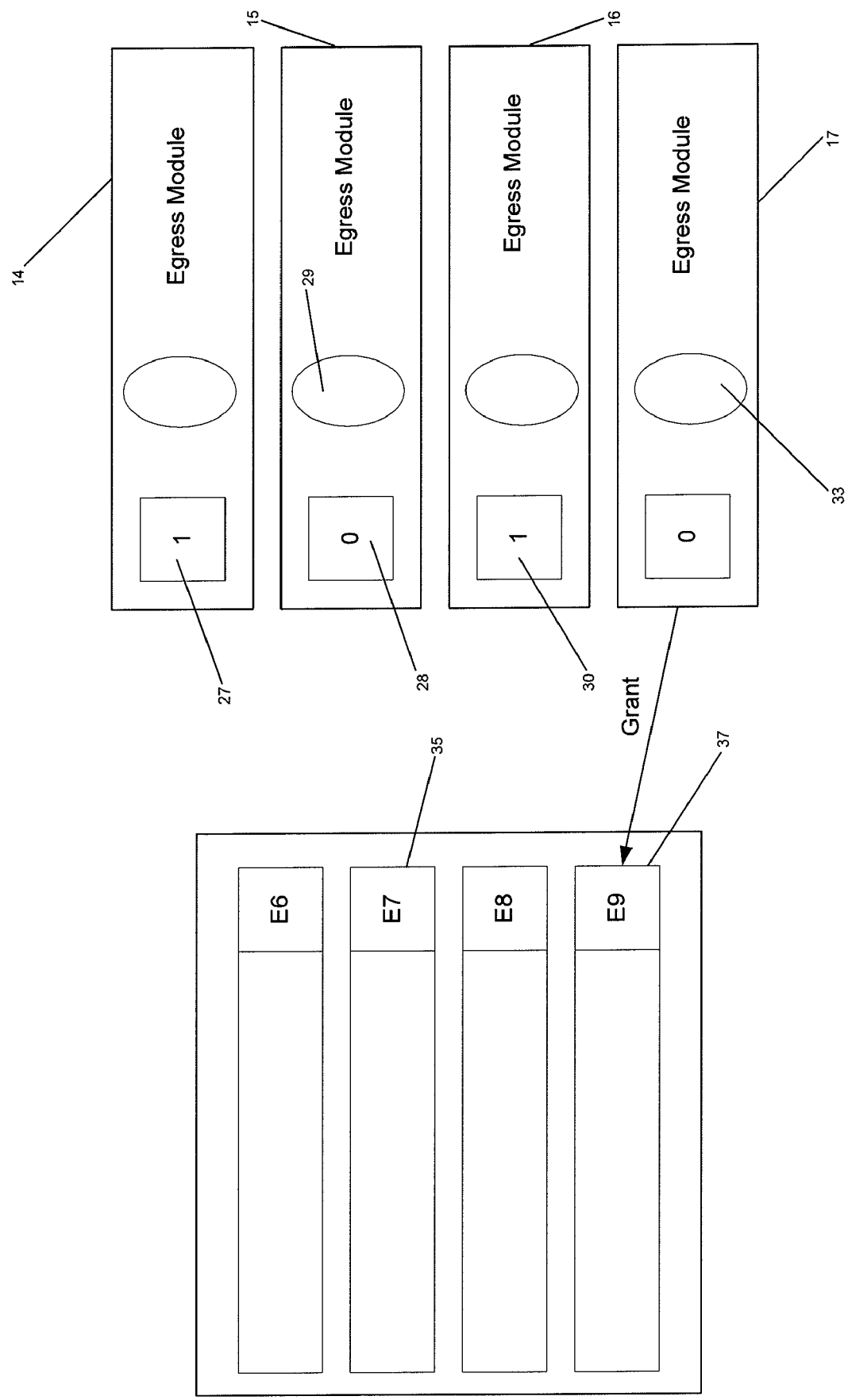

FIG. 11 shows the state of the ingress buffers after a predetermined maximum request time has passed since the state shown in FIG. 10. It can be seen that the egress arbiter 29 did not grant the request associated with the data packet 35, such that the data packet 35 has not been transmitted to the egress module 15. The egress arbiter 29 may not have granted this request if, for example, the egress arbiter 25 had received another request to send a data packet from another ingress arbiter (for example, the ingress arbiter of one of the ingress modules 11, 12, 13) and that other ingress arbiter was next in the round-robin selection of the egress arbiter 29. Given that the predetermined maximum request time has passed, a "dummy" grant signal is generated by a congestion management function as described above, to avoid the ingress arbiter waiting an excessively long time for a grant signal to be received from the egress arbiter 29. It can be seen that the credit state indicator 28 associated with the egress module 15 now has a value of '0'.

Further, it can be seen that the egress arbiter 33 has sent a grant signal to the ingress arbiter 19 indicating that the ingress arbiter 19 should transmit the packet 37 to the egress module 17. The credit state indicator 32 of the egress module 17 now has a value of '0', indicating that the egress module 17 now has insufficient credit to receive a further data packet. It can also be seen that the credit state indicator 27 of the egress module 14, and the credit state indicator 30 of the egress module 16, now have a value of '1', indicating that both the egress modules 14 and 16 now have sufficient credit to receive further data packets.

Figure 12:
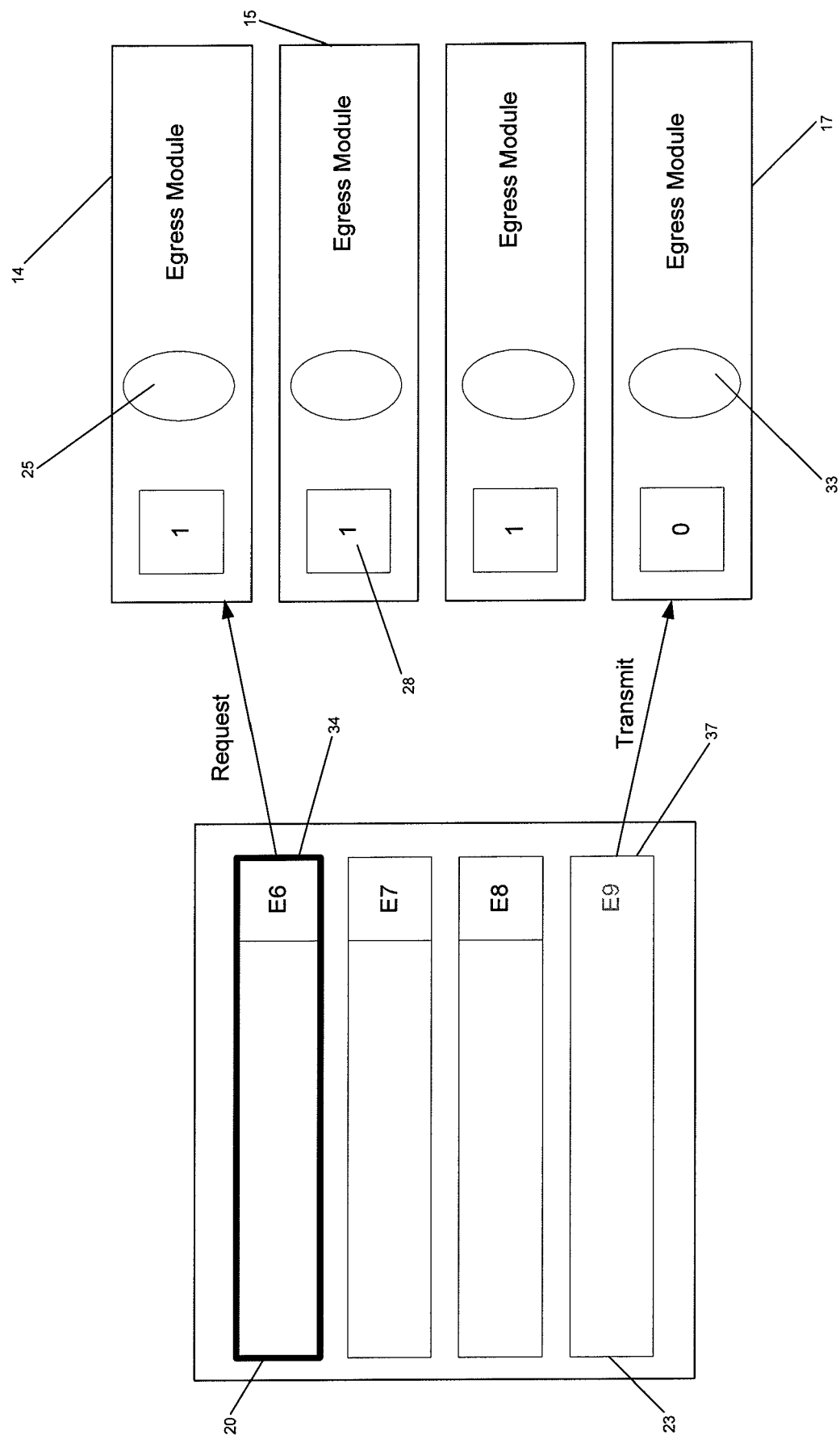

Referring to FIG. 12, it can be seen that the ingress arbiter 19 has selected a next ingress buffer, the ingress buffer 20. As the egress module 14 now has sufficient credit to receive a further data packet, the ingress arbiter 19 sends a request signal in respect of the data packet 34 to the egress module 14, indicating that it has a data packet to be sent to the egress port 6. It can also be seen that having received a grant signal from the egress arbiter 33, the ingress module 10 is transmitting the data packet 37 from the ingress buffer 23 to the egress module 17. It can further be seen that the credit state indicator 28 associated with the egress module 15 now has a value of '1', indicating that the egress module 15 now has sufficient credit to receive a further data packet.

Figure 13:
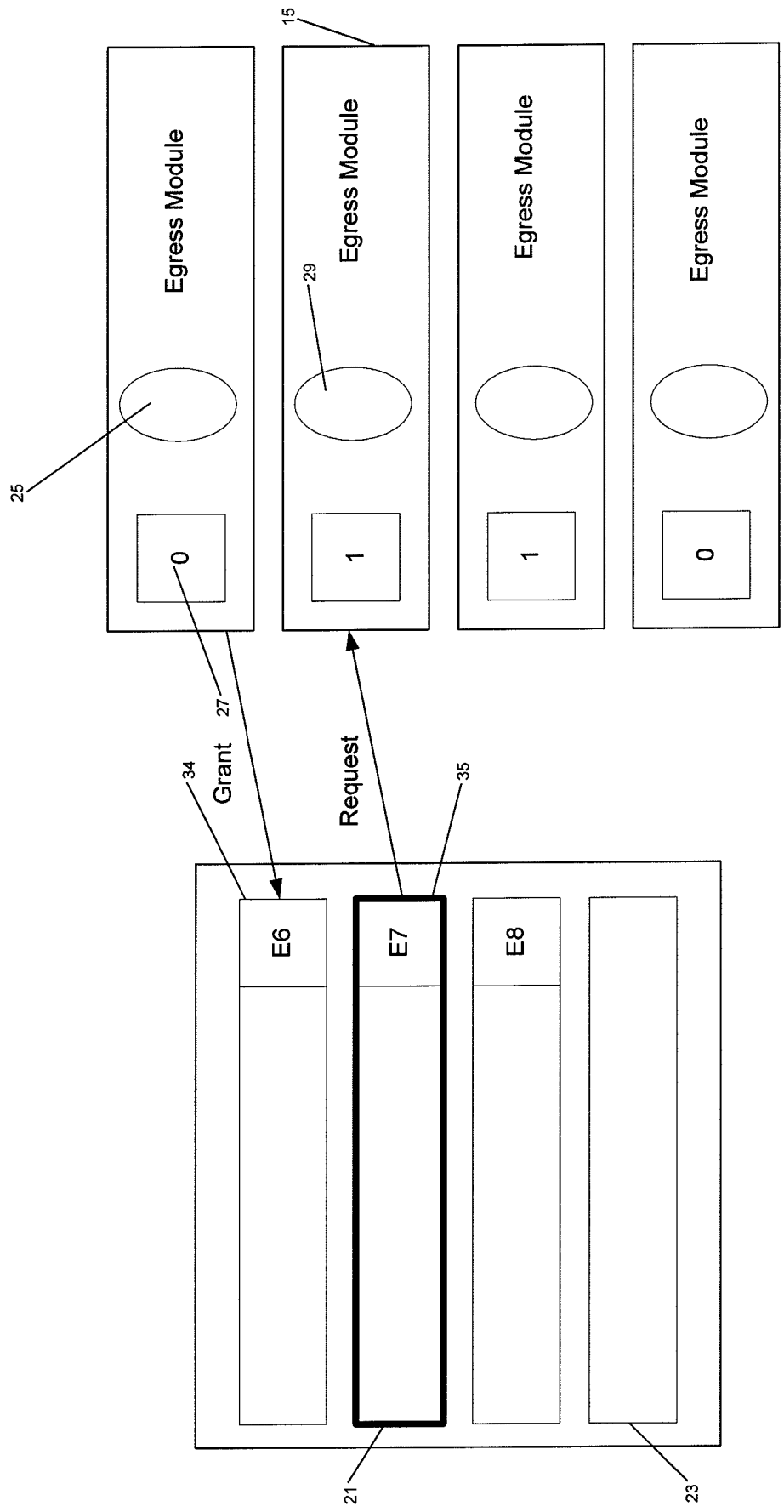

Referring to FIG. 13, it can be seen that the data packet 37 has been sent to the egress module 17 such that the ingress buffer 23 is now empty. The ingress arbiter 19, therefore selects a next ingress buffer, the ingress buffer 21. As the egress module 15 now has sufficient credit to receive a further data packet, the ingress arbiter 19 sends a request to the egress module 15 for permission to send the data packet 35.

The egress arbiter 25 has sent a grant signal to the ingress arbiter 19, indicating that the ingress arbiter 19 should transmit the data packet 34 to the egress module 14. As such, given that the egress arbiter only accepts a single data packet at a time, the credit state indicator 27 now has a value '0' to indicate that the egress module 14 does not have sufficient credit to receive a further data packet.

Figure 14:
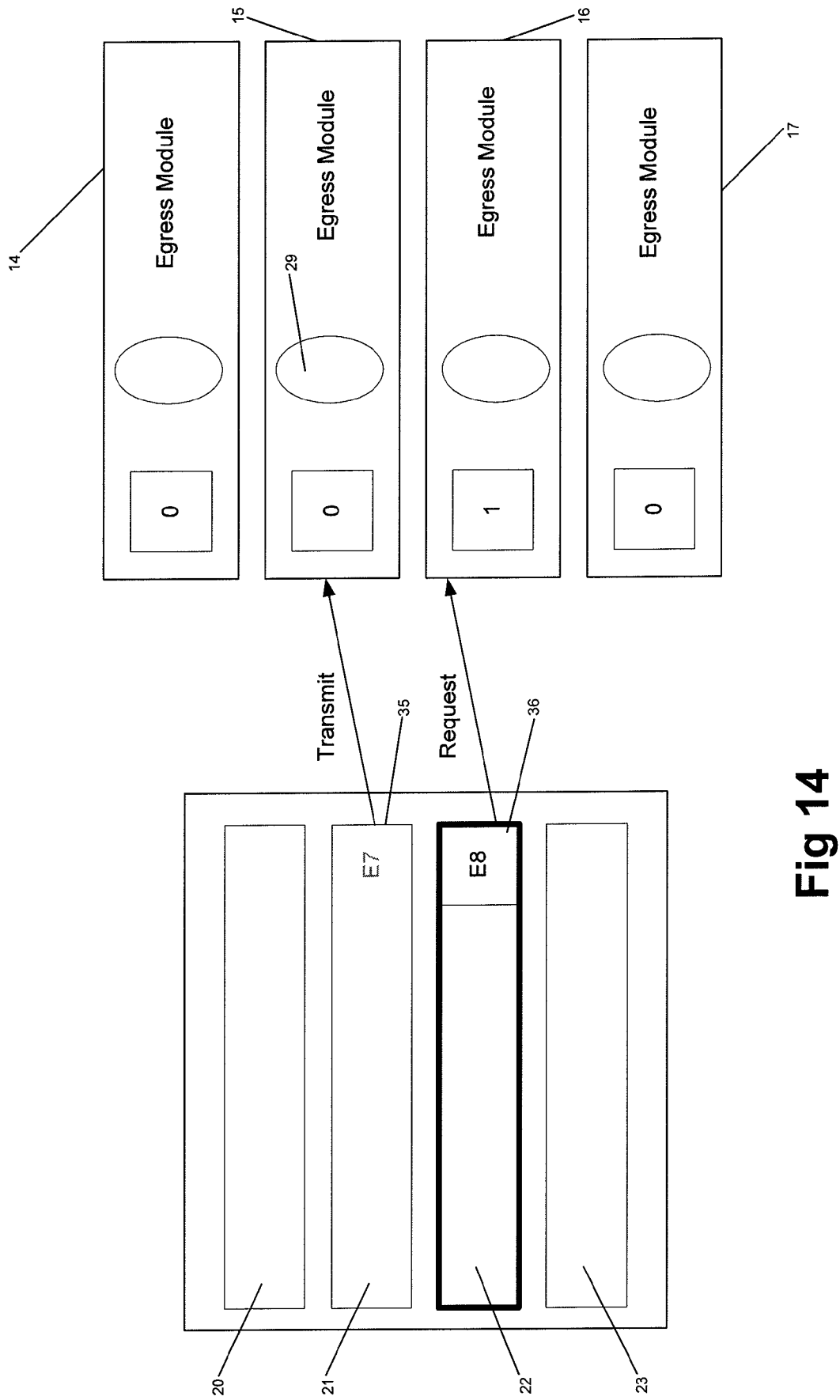

FIG. 14 shows the state of the ingress buffers 20, 21, 22 and 23 after the data packet 34 has been sent to the egress module 14. The egress arbiter 29 has granted the request from the ingress arbiter 19 for permission to transmit the data packet 35. As such the ingress arbiter 19 is transmitting the data packet 35 to the egress module 15. It can be seen that the final data packet left in the ingress buffers 20, 21, 22, 23 is the data packet 36 in the ingress buffer 22. As the egress module 16 now has sufficient credit to receive a new data packet, the ingress arbiter 19 sends a request signal to the egress arbiter 31, indicating that it has a data packet for the egress port 8.

It will be appreciated that embodiments of the present invention can be implemented in any convenient way. For example the switch of FIG. 1 may be a hardware device comprising random access memory arranged to store the ingress buffers and a processor arranged to control receipt and transmission of data packets as well as to control operation of components of the switch. The processor may take any convenient form including an application specific integrated circuit or a general-purpose microprocessor which is appropriately programmed.

Further, it will be appreciated that while the credit state indicator has been described in terms of a bit flag stored in each egress module, in other embodiments, the credit indicator may be a signal which is broadcast from the egress module to each ingress module, wherein the ingress module updates a stored credit state for each of the egress modules upon receipt of the credit state indicator.

While it is the case that the embodiments of the present invention as described above have particular relevance to PCI Express switches, the method is generally applicable to any switching application where it is necessary to send data packets from an input to a plurality of outputs where the output is any combination of a port, a link, a virtual channel or a traffic class. One example of an alternative protocol with which embodiments of the invention can be used is Infiniband.

Although the switch 1 has been described as having four ingress ports and four egress ports it will be appreciated that in many embodiments of the invention switches with greater numbers of ingress and egress ports will be provided. It will be appreciated that equal numbers of ingress and egress ports allow that same number of devices to be bidirectionally coupled to the switch. It will however be appreciated that in alternative embodiments of the invention different numbers of ingress and egress ports may be provided.

Figure 15:
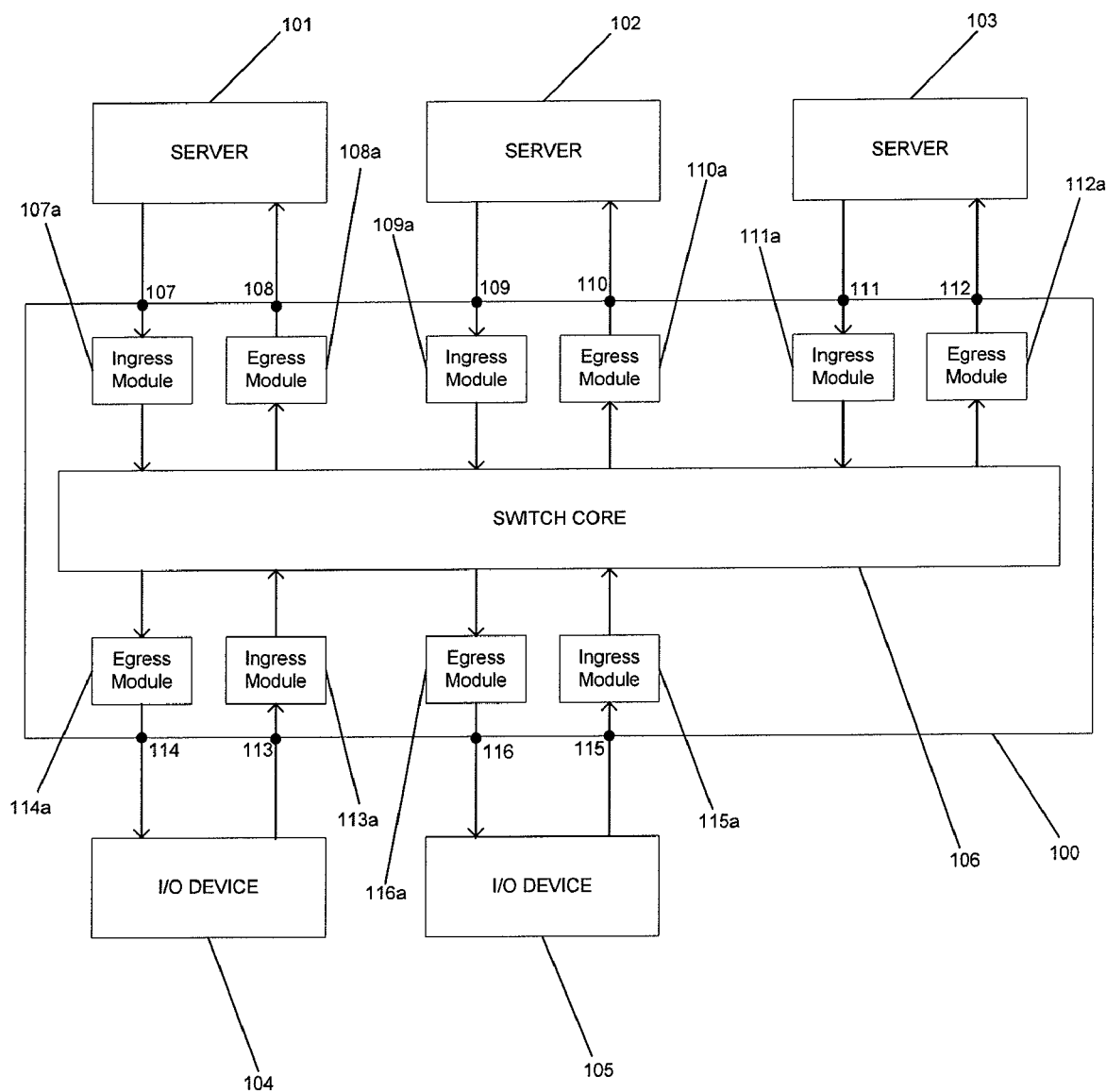
FIG. 15 is a schematic illustration of a switch in accordance with an embodiment of the invention connecting a plurality of input/output (I/O) devices to a plurality of servers.

Switches of the type described herein have a wide range of application. One particular application relates to the connection of a plurality of servers to a plurality of input/output (V/O) devices so that the plurality of servers each have shared access to each of the plurality of I/O devices. FIG. 15 is a schematic illustration of such an arrangement.

FIG. 15 shows a switch 100 connecting three servers 101, 102, 103 to two I/O devices 104, 105. The switch 100 comprises a switch core 106 arranged to direct data packets between ingress and egress ports of the switch.

The server 101 is connected to an ingress port 107 and to an egress port 108 of the switch 100. The ingress port 107 has an associated ingress module 107a of the type described above, while the egress port 108 has an associated egress port module 108a of the type described above. The connection of the server 101 to the ingress port 107 allows the server 101 to transmit data to the switch 100, while the connection of the server 101 to the egress port 108 allows data to be transmitted from the switch 100 to the server 101. The server 102 is similarly connected to an ingress port 109 having an associated ingress module 109a and to an egress port 110 having an associated egress module 110a, while the server 103 is connected to an ingress port 111 having an associated ingress module 111a and to an egress port 112 having an associated egress module 112a.

The I/O device 104 is connected to the switch 100 through an ingress port 113 having an associated ingress module 113a and through an egress port 114 having an associated egress module 114a. Similarly, the I/O device 105 is connected to the switch 100 through an ingress port 115 having an associated ingress module 115a and through an egress port 116 having an associated egress module 116a.

It will be appreciated that the arrangement shown in FIG. 15 allows resources provided by the I/O devices 104, 105 to be effectively shared by the servers 101, 102, 103.

Various modifications and applications of the present invention will be readily apparent to the appropriately skilled person from the teaching herein, without departing form the scope of the appended claims.

The invention claimed is:

1. A switching device comprising a plurality of ingress ports and a plurality of egress ports, the switching device being arranged to receive data packets through said ingress ports and to forward received data packets to respective ones of said egress ports, wherein the switching device further comprises:
    an ingress module for each of said ingress ports, each ingress module being arranged to receive data packets from a respective single one of said ingress ports and to store the received data packets in one of a plurality of data structures provided by the ingress module;
    a plurality of egress modules each arranged to receive a plurality of requests for permission to transmit data packets through a particular egress port, the requests being generated by a plurality of ingress modules, to select one of said plurality of requests, and to provide data indicating whether requests for permission to transmit data packets through a particular egress port should be made by said ingress modules; and
    wherein each ingress module is further configured to select a data packet from one of said plurality of data structures, and to request permission to transmit the selected data packet to an egress port if but only if said data provided by one of said egress modules indicates that requests for permission to transmit data packets through said egress port should be made, the request for permission not including the selected data packet;
    wherein each of said egress modules is arranged to receive said requests, to select one of said requests and to provide said data independently of and simultaneously with others of said plurality of egress modules; and
    wherein each ingress module is arranged to select data packets from said data structures and to request permission to transmit the selected data packets independently of and simultaneously with others of said plurality of ingress modules.

2. A switching device according to claim 1, wherein each of said ingress modules is arranged to select a data packet from one of said data structures independently of operation of others of said ingress modules, and independently of operation of said at least one egress module.

3. A switching device according to claim 1, wherein said at least one egress module is arranged to select one of said plurality of requests independently of operation of said ingress modules.

4. A switching device according to claim 1, wherein said data indicating whether requests for permission to transmit data packets should be made comprises data indicating a maximum size of data packet which should be associated with any request.

5. A switching device according to claim 1, wherein each of said ingress modules is arranged to determine whether requests for permission to transmit data packets through a particular egress port should be made based upon said data provided by a respective one of said egress modules.

6. A switching device according to claim 1, wherein each ingress module is further arranged to:
    determine an egress port to which a selected data packet is to be forwarded;
    determine whether a request should be made to an egress module associated with the determined egress port for permission to send the selected data packet to the determined egress port; and
    if it is determined that a request should be made, make a request to the egress module associated with the determined egress port.

7. A switching device according to claim 6, wherein each ingress module is further arranged to:
    select a further data packet to be forwarded to an egress port if it is determined that a request should not be made;
    determine an egress port to which the selected further data packet is to be forwarded;
    determine whether a request should be made to the egress module associated with the determined egress port for permission to send the selected further data packet to the determined egress port; and
    if it is determined that a request should be made, make a request to the egress module associated with the determined egress port.

8. A switching device according to claim 6, wherein each of said egress modules is arranged to provide data indicating whether requests for permission to transmit data packets through the respective egress port should be made by said ingress modules, and determining whether a request should be made to the egress module associated with the determined egress port is based upon said data provided by said egress module.

9. A switching device according to claim 1, wherein each of said ingress modules is arranged to transmit a request to transmit a particular data packet through a particular egress port and await a response to said request.

10. A switching device according to claim 9, wherein each of said ingress modules is arranged to transmit a data packet if but only if said request is granted.

11. A switching device according to claim 1, wherein at least some of said ingress modules are arranged to generate a plurality of requests to transmit data packets, each of said plurality of requests being directed to different egress modules, and each of said plurality of requests being generated before a response has been received to a first of said plurality of requests.

12. A switching device according to claim 1, wherein each egress module comprises a buffer to store data packets to be transmitted from the associated egress port.

13. A switching device according to claim 12, wherein said buffer is a single packet buffer.

14. A switching device according to claim 1, wherein the data structures provided by said ingress modules are queues.

15. A switching device according to claim 1 configured to connect a plurality of computing devices to a plurality of input/output devices.

16. A switching device according to claim 1, wherein the switching device is a PCI Express switching device.

17. A method of switching data packets between a plurality of ingress ports and a plurality of egress ports of a switching device, wherein data packets are received through said ingress ports and forwarded to respective ones of said egress ports, wherein the switching device comprises an ingress module for each of said ingress ports, each ingress module receives data packets from a respective single one of said ingress ports, stores the received data packets in one of a plurality of data structures provided by the ingress module, selects a data packet from one of said plurality of data structures, and requests permission to transmit the selected data packet to an egress port, and the switching device further comprises a plurality of egress modules each receiving requests for permission to transmit data packets through a particular egress port, the requests being generated by a plurality of ingress modules, and to select one of said requests, and providing data indicating whether requests for permission to transmit data packets through a particular egress port should be made by said ingress modules; and wherein each ingress module selects a data packet from one of said plurality of data structures, and requests permission to transmit the selected data packet to an egress port if but only if said data provided by one of said egress modules indicates that requests for permission to transmit data packets through said egress port should be made, the request not including the selected data packet;
  wherein each of said egress modules is arranged to receive said requests, to select one of said requests and to provide said data independently of and simultaneously with others of said plurality of egress modules; and
  wherein each ingress module is arranged to select data packets from said data structures and to request permission to transmit the selected data packets independently of and simultaneously with others of said plurality of ingress modules.

18. A non-transitory carrier medium carrying a computer program comprising computer readable instructions arranged to cause a switching device to carry out a method according to claim 17.

19. A non-transitory carrier medium carrying a computer program according to claim 18.

20. A switching device comprising a plurality of ingress ports and a plurality of egress ports, the switching device being arranged to receive data packets through said ingress ports and to forward received data packets to respective ones of said egress ports, wherein the switching device further comprises:
  a dedicated associated egress module for each egress port, each egress module being arranged to indicate to a plurality of sources of data packets whether requests for permission to send data packets should be sent to the egress module, to receive requests for permission to send data packets, and to transmit data in response to said requests;
  an ingress module for each of said ingress ports, each ingress module being arranged to process data packets received through a respective single one of said ingress ports and to store the received data packets in at least one data structures provided by the ingress module;
  wherein each ingress module is further configured to select a data packet from said at least one data structure, and to request permission to transmit the selected data packet to an egress port if but only if said data provided by one of said egress modules indicates that requests for permission to transmit data packets through said egress port should be made, the request for permission not including the selected data packet;
  wherein each of said egress modules is arranged to receive said requests, to transmit said data in response to said requests and to indicate whether requests for permission to send data packets should be sent to the egress module independently of, and simultaneously with others of said plurality of egress modules; and
  wherein each ingress module is arranged to select data packets from said data structures and to request permission to transmit the selected data packets independently of and simultaneously with others of said plurality of ingress modules.

21. A switching device according to claim 20,
  wherein each ingress module comprises a plurality of data structures for storing data packets received through a respective ingress port, and said selecting further comprises selecting a data structure from which a data packet should be selected for forwarding to an egress port.

22. A switching device according to claim 20,
  wherein the or each data structure is a queue.

23. A switching device according to claim 20,
  wherein each ingress module is further arranged to:
  determine an egress port to which a selected data packet is to be forwarded; and
  determine whether a request should be made to the egress module associated with the determined egress port for permission to send the selected data packet to the determined egress port; and
  if it is determined that a request should be made, make a request to the egress module associated with the determined egress port.

24. A switching device according to claim 23, wherein each ingress module is arranged to determine whether a request should be made to the egress module associated with the determined egress port for permission to send the selected data packet to the determined egress port based upon data provided by the egress module associated with the determined egress port.

25. A switching device according to claim 23, wherein each ingress module is further arranged to:
  if it is determined that a request should not be made, select a further data packet to be forwarded to an egress port;
  determine an egress port to which the selected further data packet is to be forwarded;
  determine whether a request should be made to the egress module associated with the determined egress port for permission to send the selected further data packet to the determined egress port; and if it is determined that a request should be made, make a request to the egress module associated with the determined egress port.

26. A switching device according to claim 23, further comprising:
awaiting a response to said request; and
transmitting said selected data packet or said selected further data packet if a response is received granting said request.

27. A switching device according to claim 20, wherein each egress module is arranged to receive a plurality of requests for permission to send a data packet, to select one of said plurality of requests, and to transmit data granting said selected request.

28. A switching device according to claim 20 configured to connect a plurality of computing devices to a plurality of input/output devices.

29. A switching device comprising a plurality of ingress ports and a plurality of egress ports, the switching device being arranged to receive data packets through said ingress ports and to forward received data packets to respective ones of said egress ports, wherein the switching device further comprises:
an ingress module for each of said ingress ports, each ingress module being arranged to receive data packets from a respective single one of said ingress ports and to store the received data packets in one of a plurality of data structures provided by the ingress module;
a plurality of egress modules each arranged to receive a plurality of requests for permission to transmit data packets through a particular egress port, the requests being generated by a plurality of ingress modules, to select one of said plurality of requests, and to provide data indicating whether requests for permission to transmit data packets through a particular egress port should be made by said ingress modules;
wherein each ingress module is further configured to select a data packet from one of said plurality of data structures, determine an egress port to which a selected data packet is to be forwarded and determine whether a request should be made to the egress module associated with the determined egress port for permission to send the selected data packet to the determined egress port; and
if it is determined that a request should be made, make a request to the egress module associated with the determined egress port;
wherein each of said egress modules is arranged to receive said requests, to select one of said requests and to provide said data independently of and simultaneously with others of said plurality of egress modules; and
wherein each ingress module is arranged to select data packets from said data structures and to request permission to transmit the selected data packets independently of and simultaneously with others of said plurality of ingress modules.

* * * * *